United States Patent [19]
Bernard et al.

[11] 4,431,718
[45] Feb. 14, 1984

[54] ELECTROCHEMICAL CELL WITH A LIQUID NEGATIVE ELECTRODE

[75] Inventors: Lionel Bernard, Lille; Jean-Pierre Lelieur, Lambersart; Alain Le Méhauté, Gif sur Yvette, all of France

[73] Assignee: Societe Anonyme dite: Compagnie Generale d'Electricite, Paris, France

[21] Appl. No.: 326,271

[22] Filed: Dec. 1, 1981

[30] Foreign Application Priority Data

Dec. 5, 1980 [FR] France .............................. 80 25855

[51] Int. Cl.$^3$ .......................................... H01M 10/36
[52] U.S. Cl. .................................... 429/105; 429/201
[58] Field of Search ............... 429/101, 105, 108, 201, 429/218, 192

[56] References Cited

U.S. PATENT DOCUMENTS

| | | | |
|---|---|---|---|
| 2,863,933 | 12/1958 | Minnick et al. | 429/201 |
| 2,937,219 | 5/1960 | Minnick et al. | 420/105 |
| 2,996,562 | 8/1961 | Meyers | 429/108 |
| 3,408,229 | 10/1968 | Posey, Jr. et al. | 136/6 |
| 4,060,673 | 11/1977 | Dey | 429/192 |
| 4,109,065 | 8/1978 | Will et al. | 429/105 |
| 4,164,069 | 8/1979 | Tomezuk | 429/218 |
| 4,233,377 | 11/1980 | Haering et al. | 429/218 |

FOREIGN PATENT DOCUMENTS

834122 5/1960 United Kingdom ............... 429/108

*Primary Examiner*—Donald L. Walton
*Attorney, Agent, or Firm*—Kenyon & Kenyon

[57] ABSTRACT

An electrochemical cell which has a negative electrode (1) including an alkali or alkali-earth metal dissolved in liquid ammonia, a positive electrode (2), an electrolyte (3), and a separator (4). The positive electrode (2) is constituted by a solution in ammonia of a chalcogen or of a chalcogenide or of an emulsion or suspension in ammonia of a solid compound suitable for intercalating the metal of the negative electrode (1). Said electrolyte (3) includes a solution of an iodide of an alkali or alkali-earth metal.

The invention is used in the field of reversible high-power electric cells operating at low temperatures.

5 Claims, 8 Drawing Figures

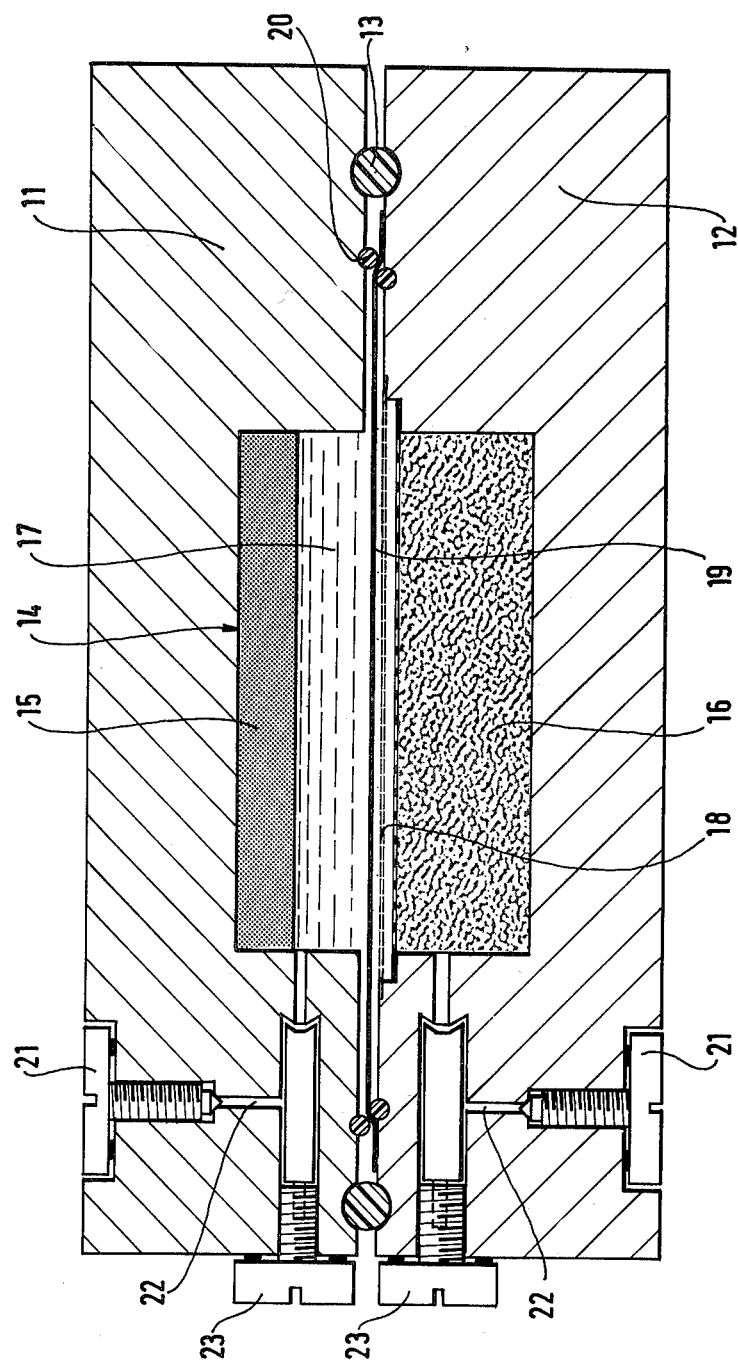

ELECTROCHEMICAL CELL WITH A LIQUID NEGATIVE ELECTRODE

The present invention relates to an electrochemical storage cell having a negative electrode which is in the liquid state.

BACKGROUND OF THE INVENTION

U.S. Pat. No. 3,408,229 granted on Oct. 29, 1968 discloses an electric cell having a negative electrode based on an alkali or alkali-earth metal, e.g. based on lithium in solution in ammonia, a positive electrode comprising a solution of thiocyanates and sulphur in ammonia, and a thin, cellophane-based membrane separating said positive electrode from said negative electrode.

However, the work done by the Applicant has made it evident that the teachings contained in said U.S. patent do not make it possible to provide an electric cell which operates adequately.

Firstly, the Applicant has observed that membranes based on cellophane are not stable in the proposed medium (e.g. $Li(NH_3)_4$) and are very rapidly destroyed.

Secondly, thiocyanates are not stable in the presence of the sulphur positive electrode, and decompose to give cyanides.

Thirdly and above all, since the cathode solution contains sulphur and wets the separator, it diffuses therethrough and mixes with the anode mass, thereby short-circuiting the cell. This is due to the fact that contrary to what is set forth by the authors of said patent, cellophane does not, in actual fact, constitute an effective barrier against sulphur dissolved in an ammonia solution nor against lithium in an ammonia solution.

Preferred embodiments of the present invention remedy these drawbacks.

SUMMARY OF THE INVENTION

The present invention provides an electrochemical cell which has a negative electrode including an alkali or alkali-earth metal dissolved in liquid ammonia, a positive electrode, an electrolyte, and a separator, wherein the positive electrode is chosen from the group formed by solutions in ammonia of a chalcogen or of a chalcogenide and by emulsions or suspensions in ammonia of a solid compound suitable for intercalating the metal of the negative electrode, said electrolyte including a solution of an iodide of an alkali or alkali-earth metal.

According to a particular embodiment of the invention, said chalcogen is sulphur.

Said chalcogenide is advantageously chosen from the group comprising alkali, alkali-earth or ammonium chalgogenides.

According to another embodiment of the invention, said substance suitable for intercalating the metal of the negative electrode is chosen from the group comprising $Li_xNiPS_3$, $Li_xFeS_2$, and $Li_xTiS_2$.

When the positive electrode is in the form of a solution, the separator is constituted by a cation-exchange membrane, in which case the electrolyte can advantageously be located within said separator.

BRIEF DESCRIPTION OF THE DRAWINGS

Embodiments of the invention are described by way of example with reference to the accompanying drawings in which:

FIG. 8 illustrates a practical embodiment of an electric cell in accordance with the invention.

MORE DETAILED DESCRIPTION

Figure 1:
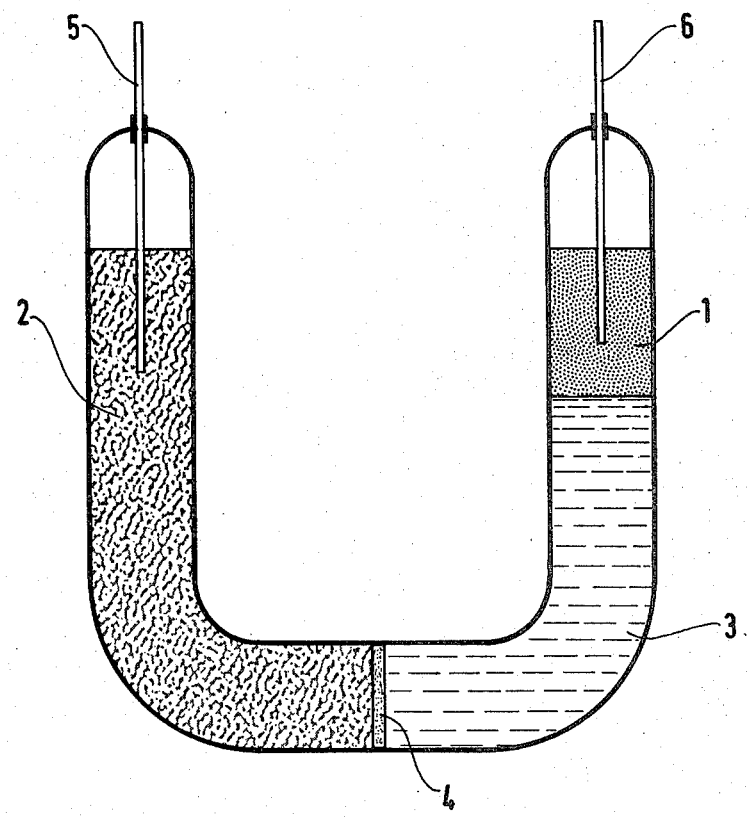
FIG. 1 very schematically illustrates the structure of an experimental electric cell in accordance with the invention.

In FIG. 1, a negative electrode 1 is formed by liquid ammonia with an alkali metal consisting e.g. of sodium, potassium, lithium or an alkali-earth metal such as calcium, in solution therein.

A positive electrode 2 is separated from the negative electrode 1 by an electrolyte 3 which contains a solution in ammonia of an iodide of an alkali or alkali-earth metal, e.g. LiI, NaF, KI or $CaI_2$, which electrolyte does not mix solution with the negative electrode 1. A separator 4 is disposed between the positive electrode 2 and the electrolyte 3. References 5 and 6 designate output terminals.

The positive electrode 2 is constituted by a solution of a chalcogen (e.g. sulphur) or of a polysulphide in liquid ammonia. The solution is impregnated in a graphite felt.

The positive electrode 2 could alternatively be constituted by a suspension or emulsion in ammonia of a compound such as $Li_xNiPS_3$, $Li_xFeS_2$, $Li_xTiS_2$ capable of intercalating the metal of the negative electrode.

Advantageously, in the case where the positive electrode is formed by a solution, the separator 4 is a cation-exchange membrane. In the case of intercalated compounds such as mentioned hereinabove, the separator may be formed by a porous non-selective membrane.

Such an electric cell operates at temperatures from $-70°$ C. up to $50°$ C. (under pressure).

The advantages of such an electric cell are as follows: The negative electrode has excellent reversibility and hence it can perform a high number of charge-discharge cycles with limited polarization and at low temperatures. The positive electrode which may be a sulphur electrode associated with a selective cation exchanger also has high reversibility.

The use of compounds for intercalating the metals of the negative electrode when constituting the positive electrode also provides for good rechargeability.

The operating principle of such an electric cell is as follows:

If the negative electrode is formed by an alkali metal A in solution in liquid ammonia, the following reactions take place:

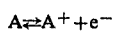

$A^+$ in solution passes through the exchanger separator.

In the case of sulphur as a positive material, the following reaction takes place:

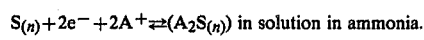

In the case of an intercalation compound Z, the reaction is:

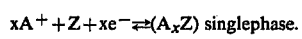

Such an electric cell can be recharged.

Figure 2:
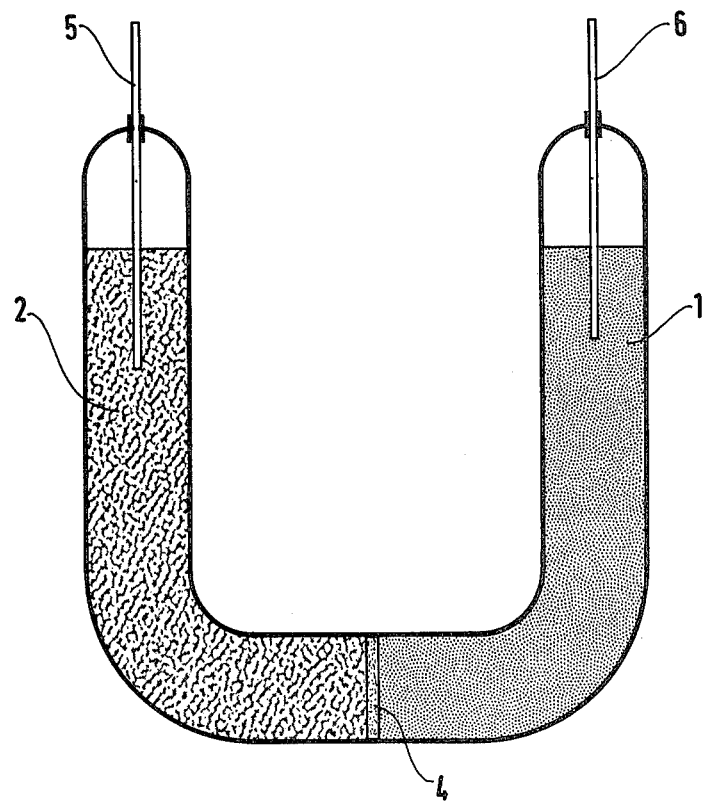
FIG. 2 also very schematically illustrates the structure of a variant experimental electric cell in accordance with the invention.
Figure 3:
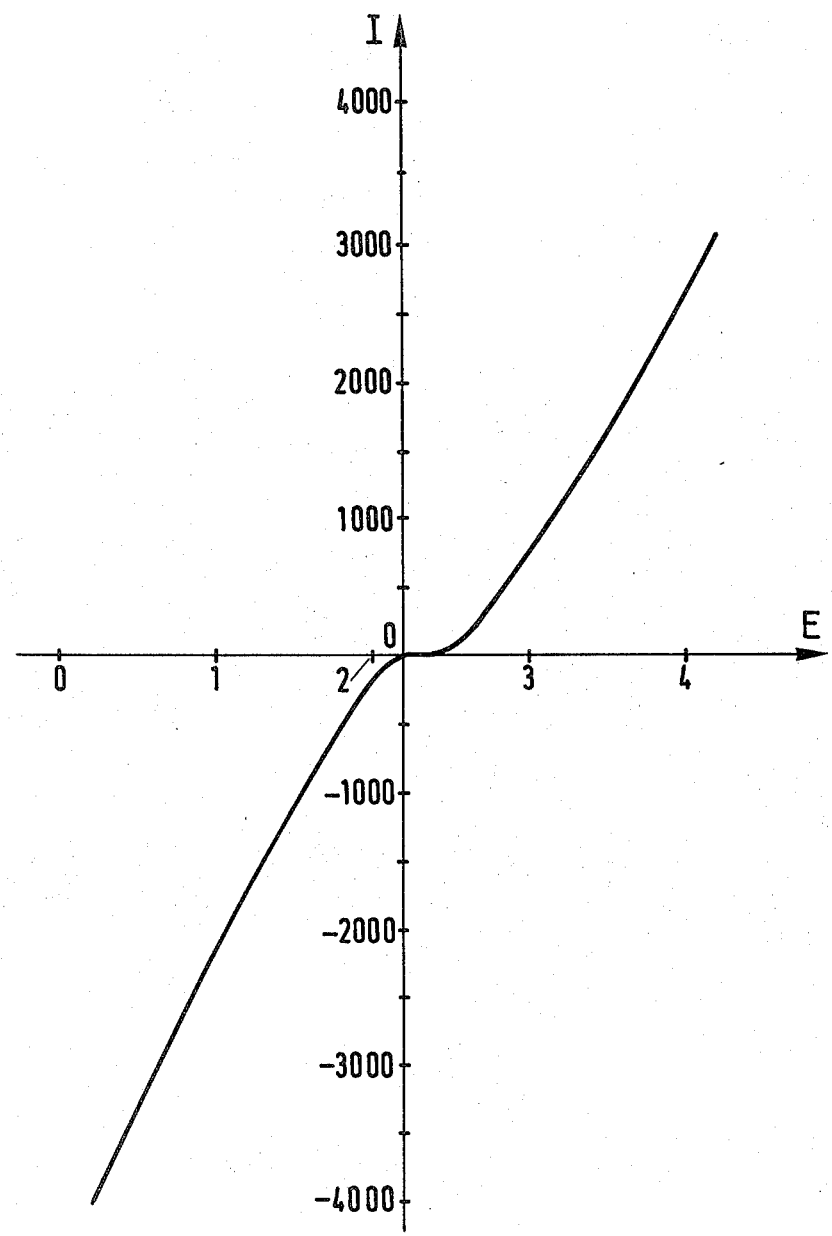
FIGS. 3 to 7 are graphs showing the performances of electric cells in accordance with the invention.
Figure 4:
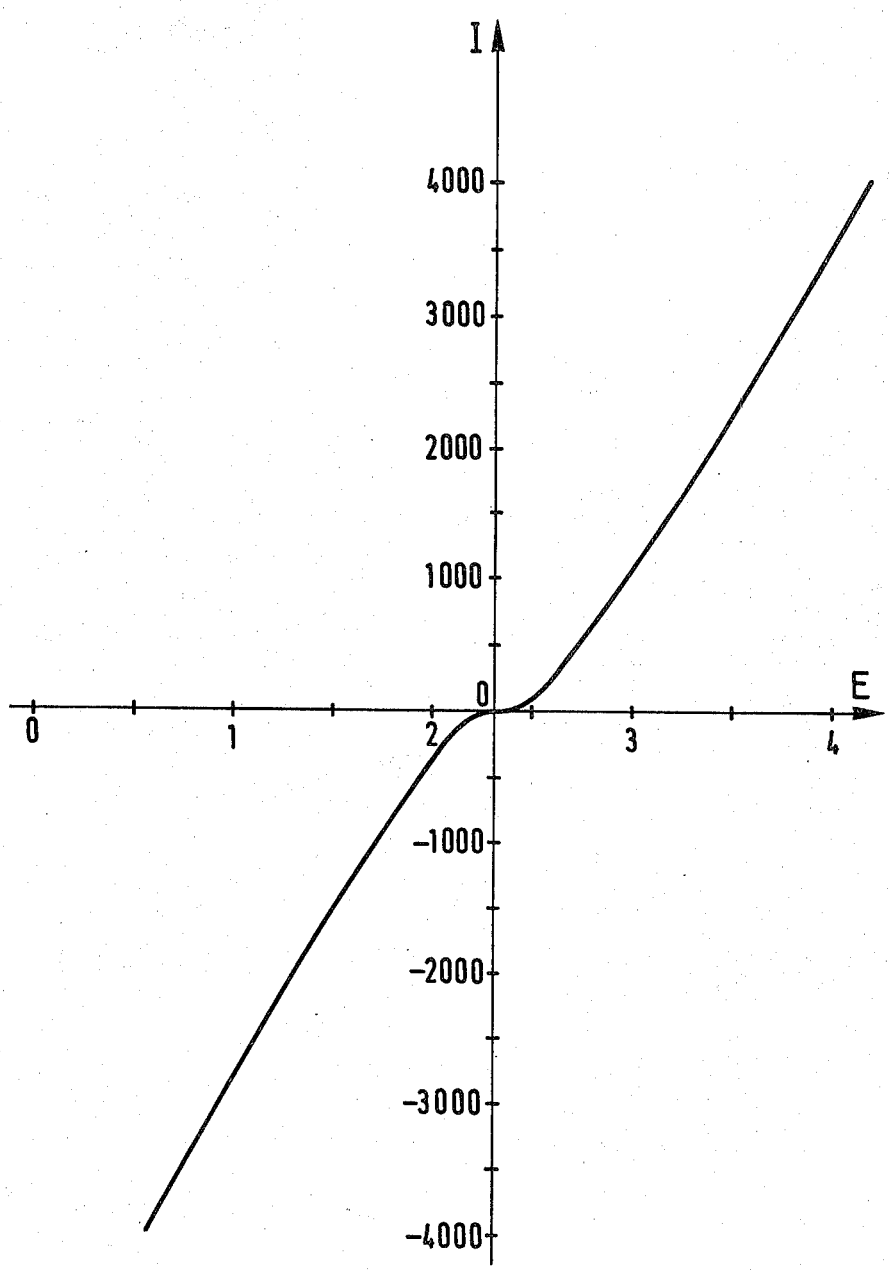
Figure 5:
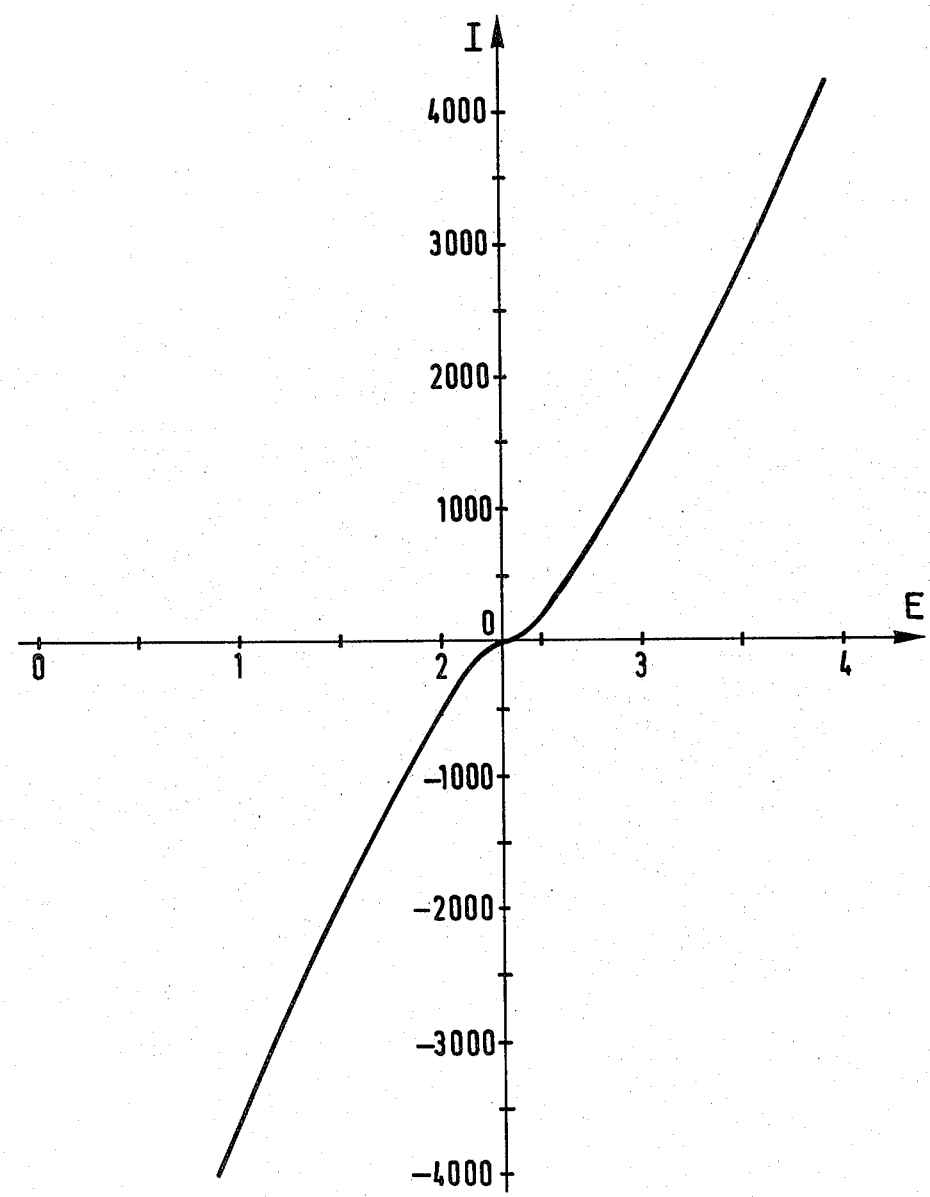

In the variant illustrated in FIG. 2 and corresponding more particularly to the case where the negative electrode is formed by a solution of sulphur in ammonia, the electrodes 1 and 2 are separated only by an exchanger membrane 4 of the cation type impregnated with electrolyte formed by a solution of an iodide of an alkali or alkali-earth metal (e.g. LiI, NaI, KI, $CaI_2$) in liquid ammonia as in the preceding case.

Such an electric cell also operates at temperatures ranging from $-70°$ C. to $50°$ C., under pressure.

By way of example, the constitution of an electric cell such as illustrated in FIG. 1 may be as follows:

The negative electrode 1 includes potassium dissolved in liquid ammonia. The electrolyte is a saturated solution of potassium iodide in liquid ammonia, the positive electrode 2 is formed by sulphur dissolved at ambient temperature and under pressure in liquid ammonia. The separator is a cation-exchange membrane with a surface area of 7 $mm^2$ of the PP2291 type sold under the trade mark "Permion" by the company RAI. The current collectors 5 and 6 are made of tungsten.

Such an electric cell has a no-load potential of about 2.3 volts.

FIGS. 3 to 7 illustrate the characteristics of such an electric cell, at temperatures of $-40°$ C. (FIG. 3), $-18°$ C. (FIG. 4) and $-2.5°$ C. (FIG. 5), with potential, E, plotted along the X-axis in volts, current, I, plotted along the Y-axis in microamps.

The capacity of the electric cell is about 1 Ah, the positive electrode being constituted by 5% sulphur in liquid ammonia (% on a molar basis).

Figure 6:
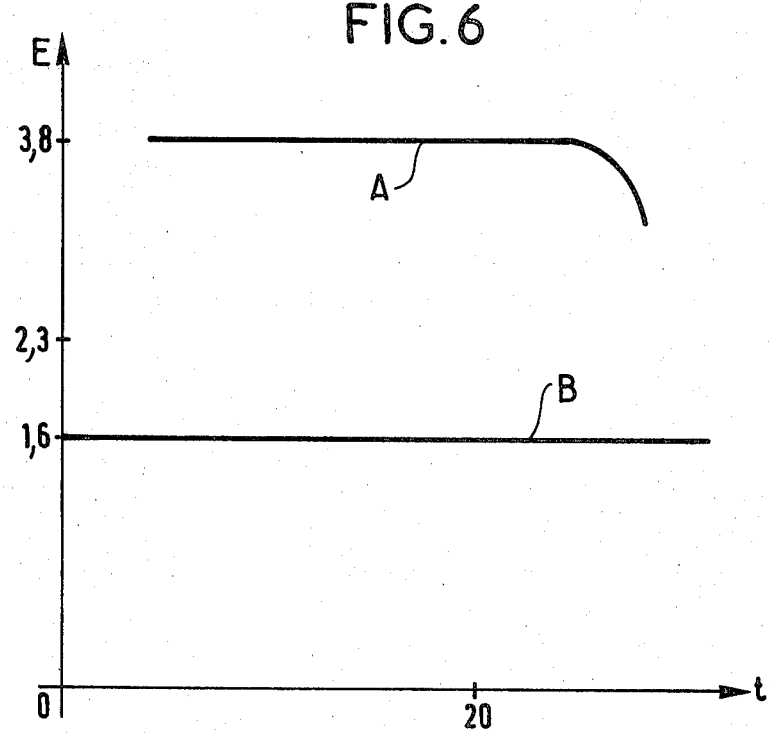

FIG. 6 illustrates the variation in the potential E (in volts) as a function of time (in hours). Curve A is for charging and curve B is for discharging at currents of 13.5 and 8.4 $mA/cm^2$ respectively from an initial state at $-40°$ C.

Excellent stability of the characteristics is observed.

Figure 7:
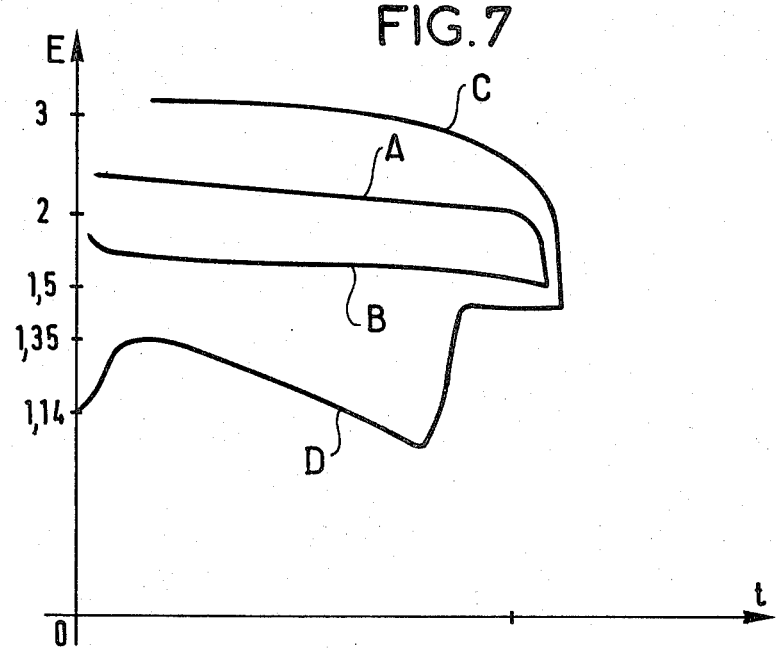

FIG. 7 illustrates the charge-discharge characteristics as a function of time at a temperature of $-40°$ C. for an electric cell whose positive electrode does not include graphite felt (curves C and D) and in the case where it does include graphite felt (curves A and B). It is seen that it is desirable to use such a felt to stabilize the characteristics.

FIG. 8 is a cross-section through a practical embodiment of an electric cell in accordance with the invention.

It has two stainless steel circular plates 11 and 12 laid one on the other and fixed together in a sealed manner by means of a silicone O ring 13.

The plates delimit an inner cavity 14 in which the negative electrode 15, the positive electrode 16 and the electrolyte 17 are disposed.

A grating 18 is designed to support a separator membrane 19; O rings such as 20 provide sealing and serve to limit the membrane short of the O ring 13.

Stoppers 21 block filler ducts 22 which also include cocks 23 for closing purposes.

It is possible to produce an electric cell which has a structure analogous to that of FIG. 8, but in which the negative electrode is constituted by a solution of potassium in ammonia represented by the formula K $(NH_3)_4$ which is not mixed with an electrolyte solution of KI in ammonia.

The positive electrode is constituted by a suspension of $NiPS_3$ in ammonia. The non-selective separator membrane can be made of polyethylene felt.

Such an electric cell has slow self-discharge which does not affect its electrochemical behaviour in that the electrodes can be recharged. Its equilibrium potential lies between 1.5 V and 2.2 V and it accepts current densities of more than 5 milliamps/$cm^2$ with polarization of less than 1 V both during charging and during discharging.

By way of example, the constitution of an electric cell such as illustrated in FIG. 2 can be as follows.

The negative electrode includes potassium dissolved in liquid ammonia.

The positive electrode contains 20% (moles) of sulphur also dissolved at ambient temperature and under pressure in liquid ammonia.

These electrodes are separated by a cationic membrane of the aforementioned LDE P2291 type with a surface area of 7 $mm^2$. It is impregnated with KI dissolved in liquid ammonia. Its resistance is 600 ohms at about $-40°$ C.

Such an electric cell has a no-load potential of about 2.3 volts and a capacity of about 1 Ah and its characteristics are substantially those previously set forth with reference to FIGS. 3 to 7.

Advantageous applications are found for the invention in the field of high-power reversible electric cells which operate at low temperature.

We claim:

1. An electrochemical cell comprising a negative electrode including an alkali or an alkali-earth metal dissolved in liquid ammonia, a positive electrode, a separator formed by a porous non-selective membrane, and an electrolyte, wherein the positive electrode is chosen from emulsions or suspensions in ammonia of a solid compound suitable for intercalating the metal of the negative electrode, and said electrolyte includes a solution of an iodide of an alkali or alkali-earth metal.

2. An electrochemical cell according to claim 1 wherein said porous separator is composed of polyethylene felt.

3. An electric cell according to claim 1, wherein said alkali or alkali-earth metal is chosen from the group comprising sodium, potassium and lithium, as alkali metals and calcium as alkali-earth metal.

4. An electric cell according to claim 1, wherein said compound suitable for intercalating the metal of the negative electrode is chosen from the group comprising $Li_xNiPS_3$, $Li_xFeS_2$, and $Li_xTiS_2$.

5. An electric cell according to claim 1, wherein said electrolyte is disposed between said negative electrode and said separator.

* * * * *